United States Patent [19]
Shimada

[11] Patent Number: 6,144,642
[45] Date of Patent: Nov. 7, 2000

[54] SIGNAL TRANSFER DEVICE IN A TELECOMMUNICATIONS NETWORK

[75] Inventor: Naohiro Shimada, Tokyo, Japan

[73] Assignee: NEC Corporation, Tokyo, Japan

[21] Appl. No.: 08/910,747

[22] Filed: Aug. 13, 1997

[30] Foreign Application Priority Data

Aug. 13, 1996 [JP] Japan ........................... 8-213508

[51] Int. Cl.$^7$ ............... G01R 31/08; H04B 10/08
[52] U.S. Cl. ........................... 370/242; 359/110
[58] Field of Search .................. 370/242, 244, 370/247, 250, 251, 445, 248, 406, 224; 359/110, 124; 703/24; 379/10, 29; 706/52

[56] References Cited

U.S. PATENT DOCUMENTS

| | | | |
|---|---|---|---|
| 4,649,515 | 3/1987 | Thompson et al. | 706/52 |
| 5,159,595 | 10/1992 | Flanagan et al. | 370/224 |
| 5,193,087 | 3/1993 | Lichtash et al. | 370/360 |
| 5,313,453 | 5/1994 | Uchida et al. | 370/248 |
| 5,606,551 | 2/1997 | Kartalopoulos | 370/406 |
| 5,636,206 | 6/1997 | Amemiya et al. | 370/244 |
| 5,757,526 | 5/1998 | Shiragaki et al. | 359/110 |
| 5,828,863 | 10/1998 | Barrett et al. | 703/24 |
| 5,838,924 | 11/1998 | Anderson et al. | 709/239 |

FOREIGN PATENT DOCUMENTS

| | | |
|---|---|---|
| 569260 | 11/1993 | European Pat. Off. . |
| 4-165846 | 6/1992 | Japan . |
| 93-5977 | 2/1993 | Japan . |
| 5-276187 | 10/1993 | Japan . |
| 7-202897 | 8/1995 | Japan . |
| 2278981 | 12/1994 | United Kingdom . |

Primary Examiner—Hassan Kizou
Assistant Examiner—John Pezzlo
Attorney, Agent, or Firm—Sughrue, Mion, Zinn Macpeak & Seas, PLLC

[57] ABSTRACT

Disclosed is a transfer device within a telecommunications network capable of transferring control information at high speed without reducing main signal through-put and also capable of greatly reducing the processing burden on the control center while avoiding high physical cost and power consumption. Trouble and control information in a communication signal are detected at an incoming section, notification thereof is sent to an outgoing section and the relevant control information is inserted into the communication signal at the outgoing section. Furthermore, notification destinations of trouble and control information are stored based on the switching mode of the communication signal and notifications of trouble and control information are sent directly to the destined outgoing section without being switched. Moreover, signals are sent by multi-master mode or by Ethernet 10 Base-2.

8 Claims, 4 Drawing Sheets

SIGNAL TRANSFER DEVICE IN A TELECOMMUNICATIONS NETWORK

BACKGROUND OF THE INVENTION

1. Field of the Invention

The present invention relates to a signal transfer device for switching and transferring communication signals and carrying out transfer processing of control information to perform switching and transferring; in particular, the present invention relates to a transfer device for transferring control information in a signal transfer device by detecting a trouble and discriminating control information in a communication signal and sending said trouble and control information using incoming/outgoing packages which differ according to the switching mode.

2. Description of the Related Arts

The switching mode such as cross-connect, add-drop and non-symmetrical switchings have been used within a telecommunications network. Therefore, it has been necessary for a transfer device to transfer control information in a telecommunications network to detect trouble and discriminate control information and transfer them using incoming/outgoing packages which differ according to the switching modes of the telecommunications network.

FIG. 1 is a diagram showing a conventional configuration example to explain a conventional transfer device including transference of trouble and control information.

The transfer device depicted in the diagram is an asynchronous transfer mode (hereinafter ATM) transfer device 300 having incoming sections 301–303, a cross-connecting switching section 307 and outgoing sections 304–306.

In this example there are 3 incoming sections and corresponding virtual paths (hereinafter VP) VP1, VP2 and VP3, VP1 is connected from incoming section 301 to outgoing section 305 via the switching section 307, VP2 is connected at incoming section 302 and virtual channels (hereinafter VC) VC1 and VC2 are extracted from VP2. Similarly, VC3 and VC4 are extracted from VP3 at incoming section 303.

The communication signals are switched at the switching section 307, such a way that VC1 and VC3 are connected to outgoing stage 304 and multiplexed to form VP4, VC2 and VC4 are connected to outgoing stage 306 and multiplexed to form VP5, thereby VP1, VP4 and VP5 are transmitted to succeeding nodes.

When the optical fibers accommodating VP1 and VP3 is disconnected, a detector 311 in the incoming section 301 detects the disconnection (hereinafter LOS) and outgoing section 305 is notified the LOS via the main VP1 signal. At outgoing section 305, an inserter inserts a VC-AIS (VC Alarm Indication Signal) control signal to the communication signal.

Furthermore, incoming stage 303 notifies outgoing sections 304 and 306 and these outgoing sections 304 and 306 insert VC-AIS control signals to the communication signals.

Thus the notification destination of trouble differs according to the switching modes that is how the communication signal is switched at switching section 307. This switching modes are a cross-connection switching node, an add-drop switching mode and a non-symmetrical switching mode.

In other words, the add-drop switching mode is included in the cross-connection switching mode which switches a required signal from the aggregate side to the tributary side or vice versa. In the non-symmetrical switching mode, a switching section switches between un-symmetric numbers of ports (hereinafter "multi-casts"), for instance, between a single incoming section and multiple outgoing sections.

Since the reciprocal relationships between the incoming and outgoing sections vary depending on the switching mode in the telecommunications network, detection of control information (e.g. LOS) at a transfer device and transmission of control signals (e.g. AIS) from the outgoing sections must be performed in accordance with these varying relations between the incoming and outgoing sections.

In other words, the notification destinations of control information in the transfer device can be flexibly served.

An AIS signal transmission system for a telecommunications network disclosed in Journal of Technical Disclosure (JIII) by Japan Invention Association Lay-out No. 5977/93 is shown in FIG. 1 as a concrete first conventional example. In this case, control information are placed in the respective main signals.

In other words, since a required control information is automatically placed within a main communication signal at the incoming section prior to be transferred and transmitted without being changed, no special control is needed within the device for transference and the control information can be transferred and transmitted at high speed.

The advantage of the above-mentioned conventional example is that there is no need for indicating the transfer destination of control information designating which control information should be placed on which main signal at the incoming section, but there is the possibility that the through-put of the main signal will be adversely affected as explained below.

FIG. 2 shows a second conventional example disclosed in JIII Lay-out No. 5977/93 wherein transmission of the control information is carried out via a third party, which is in this case a control center.

The advantage of this second conventional example is that there is no influence on the through-put of the main signal as in the first conventional example, since the required control information is not inserted into the main signal but is transmitted through the control center.

In addition, a third conventional example is that disclosed in Japanese Patent Application Lay-out No. 165846/92. The object of this third conventional example is to reduce the amount of processing within the transfer device by means of an alarm transfer method wherein each transfer device has a distributed path setting table in advance from a network control center and when a fault occurs, an appropriate path setting is carried out in compliance with the path setting table.

However, when transferring control information by the way of any of the above conventional examples, the following problems are arisen.

According to the first conventional example, there is no band increase caused by the control information transfer in synchronous transfer mode (hereinafter STM), but in ATM, the control information transfer causes an increase in the number of frequency bands and thereby reduces the through-put of the main signal as it passes through the switching section.

According to the second conventional example, as explained in JIII Lay-out No. 5977/93, data indicating the transfer destination of control information are managed at a control center and when a great number of control signals have to be transferred simultaneously, processings of data indicating the transfer destination are concentrated in this control center resulting that control information cannot be transferred at high speed; if high speed transfer is required, the concentrated considerable processings at the control center request high physical costs and increase of power consumption.

SUMMARY OF THE INVENTION

It is therefore the object of the present invention to solve the above-mentioned problems by providing an improved transfer device for transferring control information in a telecommunications network. The transfer device is required to be capable of transferring control information at high speed without reducing main signal through-put and of greatly reducing the processing burden on the control center while avoiding high physical cost and power consumption.

In order to achieve the above objects, a transfer device in a telecommunications network of the present invention comprises a plurality of incoming section to receive incoming communication signals, a switching section for switching incoming communication signals, and a plurality of outgoing sections for transmitting connected communication signals; wherein the incoming section have detection means for detecting trouble, discrimination means for discriminating a control information in an incoming communication signal, notification means for notifying the detected trouble and discriminated control information to a corresponding outgoing section and a switching information memory provided at the notification means for storing notification destinations for the trouble and other control information based on the switching mode direct transferring and, means for transferring the trouble and control information directly to a destined outgoing section, the outgoing section has discrimination means for discriminating the notified trouble and control information, inserting means for inserting the trouble and relevant control information to a main signal in accordance with said notification, and receiving means for receiving the trouble and control information directly transferred from the incoming section.

The present invention preferably to comprises a direct transferring means provided with a sending and receiving means at the incoming and outgoing sections respectively with multi-master mode or with Ethernet 10 Base-2.

BRIEF DESCRIPTION OF THE DRAWINGS

For a more complete understanding of the present invention and the advantages thereof, reference is now made to the following description taken in conjunction with the accompanying drawings.

DESCRIPTION OF THE PREFERRED EMBODIMENTS

The preferred embodiments of the present invention is explained hereinafter with reference to the diagrams.

Figure 1:
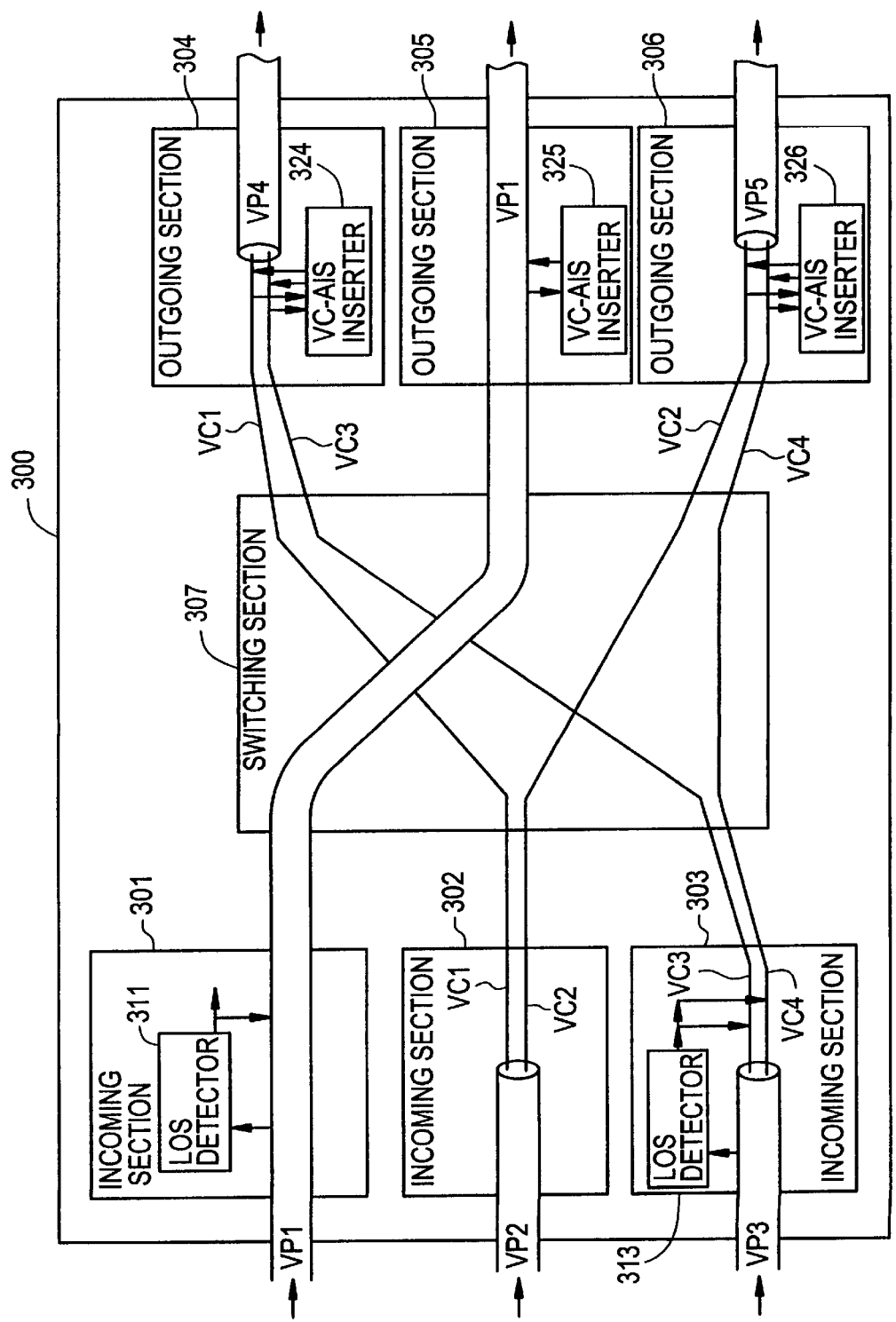
FIG. 1 is a diagram depicting a first example of a conventional transfer device in a telecommunications network.
Figure 2:
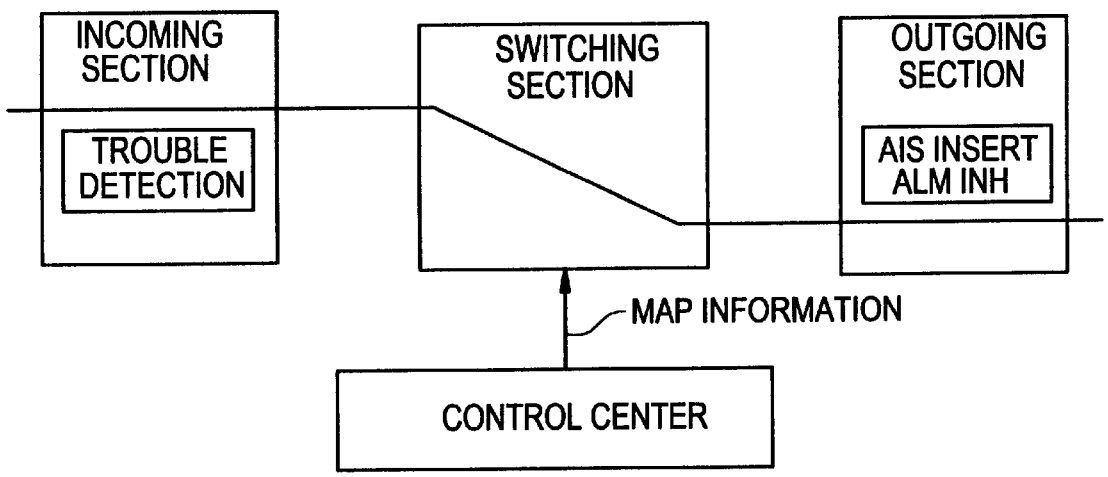
FIG. 2 is a diagram explaining a second conventional example.
Figure 3:
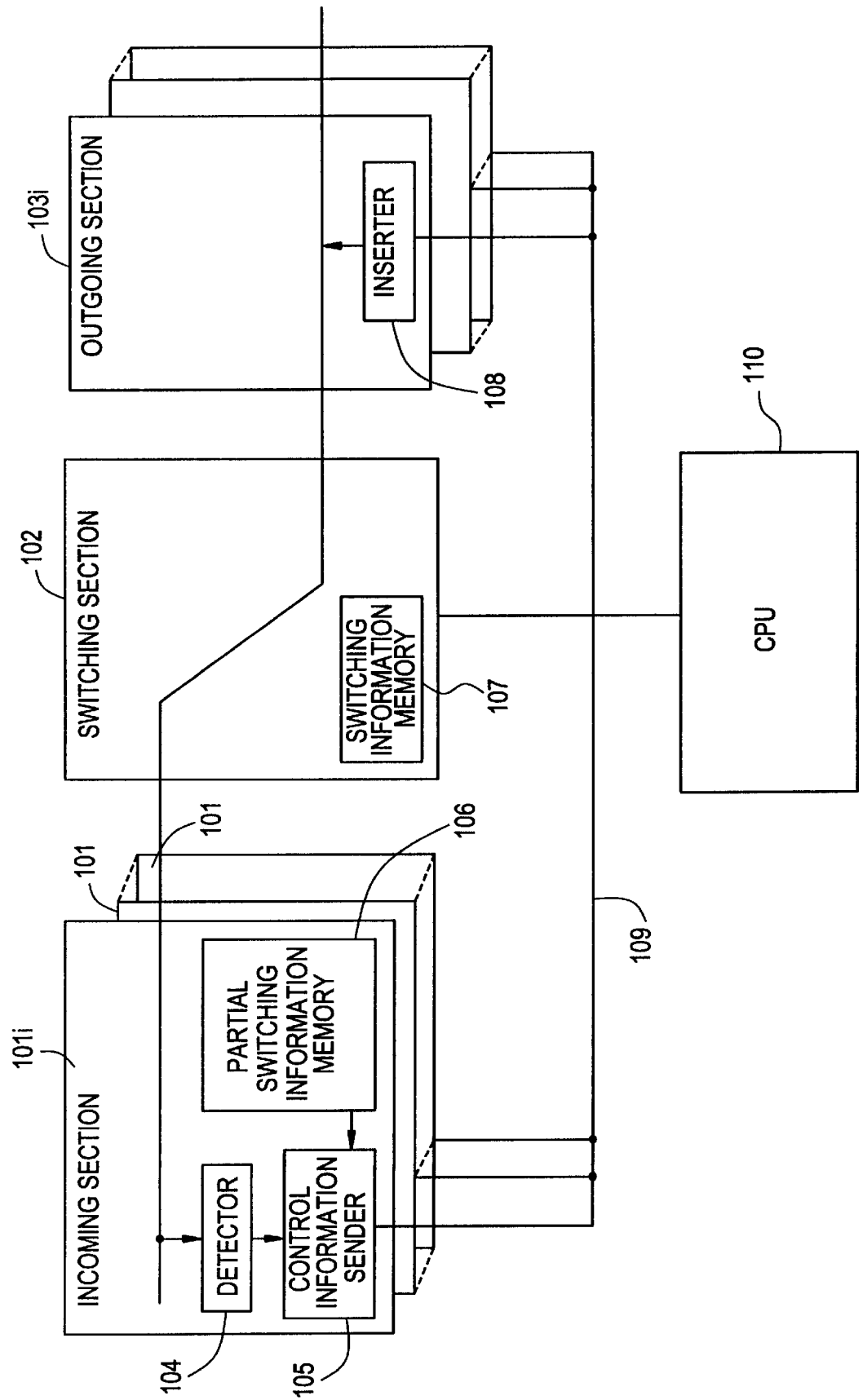
FIG. 3 is a diagram depicting a first embodiment of a transfer device based on the present invention in a telecommunications network.
Figure 4:
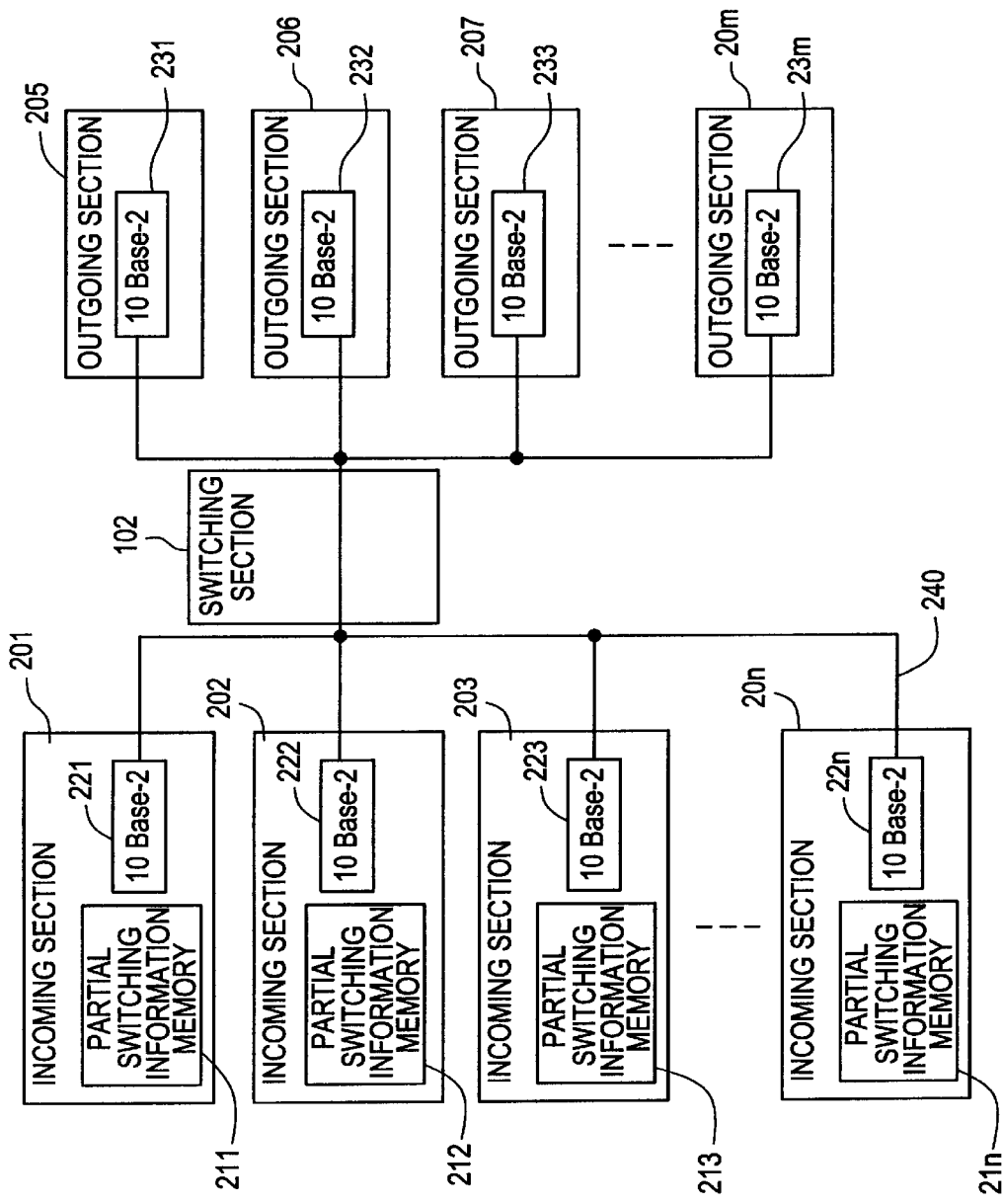
FIG. 4 is an explanatory diagram of a second embodiment of a transfer device of the present invention.

Those components shown in FIGS. 3 and 4 which have identical functions to those in the conventional examples shown in FIGS. 1 and 2 are here reproduced with identical numberings and detailed explanations of these components are omitted.

FIG. 3 shows a configuration of a first embodiment of a transfer device in a telecommunications network of the present invention.

The first embodiment of the invented transfer device consists of multiple incoming stages $101_1 \ldots 101_n$ to which a communication signal are inputted from a preceding device, switching stage 102 for switching an inputted communication signal in compliance with a switch control instruction, a plurality of outgoing stages $103_1 \ldots 103_n$ for outputting a switched communication signal to the succeeding device and central processing unit (CPU) 110 for controlling all these functional components and providing switch control instructions.

Incoming section $101_1$ comprises detector 104 for detecting control information in a communication signal, control information sender 105 for sending notification of the detection of the control information to the outgoing section and partial switching information memory 106.

Furthermore, outgoing section 103 is provided with inserter 108 for inserting a relevant control signal in accordance with the notification.

Multiple incoming sections $101_1 \ldots 101_n$, switching section 102 and multiple outgoing sections $101_1 \ldots 101_n$ are reciprocally connected by means of a switching information/control information bus 109 in order to send control information between these sections.

Control information consists, for instance, of information relating to trouble in a communication signal or to a switch control included in the communication signal.

Ordinarily, switch control instructions are set beforehand in the switching information memory 107 of switching section 102, or dynamically rewritten to switching information memory 107 by CPU 110 depending on the current application, in a particular case, rewritten to the switching information memory 107 by switching section 102 per se.

Switching information/control information bus 109 transfers control information in multi-master mode; a conventionally known bus in which switching information and control information from CPU 110 are transferred between incoming sections $101_1 \ldots 101_n$ and the outgoing sections $103_1 \ldots 103_n$ may be used.

Switching information memory 107 stores transmission formats for outgoing section 103 corresponding to each communication signal and transmission formats for differentiating of VPs and VCs, thereby forming a routing table.

Partial switching information memory 106 stores related portion of the switching information copied from switching information memory 107 duplicately in switching section 102 and the part of the routing table which corresponds to incoming section 101i is as partial switching information.

In other words, partial switching information memory 106 holds only the partial switching information which corresponds to the communication signal handled by incoming section 101i. The partial switching information corresponding to incoming stages $101_1 \ldots 101_n$ is stored in incoming stages $101_1 \ldots 101_n$ respectively.

The operation of the first embodiment is explained hereinafter.

When a communication signal is sent from incoming section 101i to switching section 102, the switching section 102 establishes the transmission path at incoming section 101i and outgoing section 103k by referring to switching information memory 107 and switches the communication signal accordingly.

If a communication signal being inputted to incoming section 101i is disconnected, detector 104 in incoming section 101i detects this LOS and outputs LOS to control information sender 105. The control information sender 105 receives this LOS and refers to partial switching information memory 106.

From memory 106, outgoing section 103 is retrieved as the path (VP or VC) of the disconnected communication signal and is thereby destined to be transferred; this information is appended to an AIS insertion instruction and transmitted as control information relating to the LOS.

Therefore, the main signal is transferred from switching section 102 to outgoing section 103k and control information is transferred directly from incoming section 101i through switching information/control information bus 109 and the control information relating to AIS is inserted to the communication signal at outgoing section 103.

FIG. 4 shows the configuration of a second embodiment of the present invention.

The communication mode used here is Ethernet. Partial switching information memories 211~21n and 10Base-2 sending/receiving portions 221~22n for sending and receiving in a multi-master mode communications via switching information/control information bus 240 are provided respectively to incoming sections 201~20n.

Sending/receiving portions 231~23m for sending/receiving multi-master mode communications are also provided to each of outgoing sections 205~20m.

In this case, sending/receiving in the multi-master mode communications at sending/receiving sections 221~22n and 231~23m is controlled with 10Base-2 communications function.

Therefore, the information format of transfer destination information in each of the partial switching information memories 211~21n also conforms to 10Base-2 sending/receiving function.

The operation of the second embodiment is explained hereinafter.

If incoming section 201 detect a LOS when a communications signal is going to be switched partial switching information memory 211 is referred.

The corresponding transfer destination among outgoing section 205~20m is retrieved and appended to an AIS insertion instruction and an Ether packet consisting of control information is transferred.

Therefore, each outgoing section 205~20m can receive an Ether packet directly from incoming section 201 along a transfer route different from that of the main signal through switching section 102.

The time period between LOS detection and insertion of AIS control information is restricted within 500 ms in accordance with GR-1248-CORE Issue 1, August 1994 BCR.

One method of improving "transmittance performance" by decreasing this time period and increasing the number of AIS which can be processed simultaneously is for instance to increase the transfer frequency at the multi-master mode switching information/control information bus 204.

A case in which VP and VC are inputted together is explained hereinafter with reference again to FIG. 1.

When incoming section 301 detects LOS, incoming section 301 retrieves the destination from the partial switching information memory 106 and notifies LOS to outgoing section 305; when outgoing section 305 inserts a VP-AIS control signal to the communications signal.

Outgoing sections 304 and 306 insert VC-AIS control signals to communication signals after receiving notification from incoming section 302.

Therefore, the present invention is effective, because the conventional transfer device needs to differ the LOS transfer destinations depending on the switching destination through the switching stage 307.

The object of the present invention differs from that of the second conventional example and the fact that the present invention is a transfer device for control information without using another node such as a control center. The present invention is further characterized in that transfer is carried out according to a "multi-master mode" communication.

As explained above, a transfer device according to the present invention has the following advantageous effects.

Firstly, since control information is transferred along a different route from the main signal transfer route, there is absolutely no influence on the main signal through-put when the network is ATM and is it possible to reduce the basic cycle time period when the network is STM.

Secondly, since control information is transferred directly from the incoming section to the corresponding outgoing section rather than via a third party such as a control center, a control information can be rapidly sent from the transfer device to the succeeding node.

Thirdly, an additional benefit of this second effect is that the burden of trouble processing and supervisions at a third party such as a control center can be greatly reduced even though control signal transmission speed is increased.

Fourthly, reductions in the cost of the overall device and power consumption can be achieved by using a conventionally known switching information/control information bus, minimizing the amount of hardware appended.

It is therefore possible to provide a transfer device which is capable of transferring control information at high speed without reducing main signal through-put while simultaneously greatly reducing the processing burden on the control center and avoiding high physical cost and increase of power consumption.

Although the preferred embodiment of the present invention has been described in detail, it should be understood that various changes, substitutions and alternations can be made therein without departing from spirit and scope of the inventions as defined by the appended claims.

What is claimed is:

1. A transfer device in a transfer node within a telecommunication network comprising:

a plurality of incoming sections at which communication signals are received from preceding nodes;

a switching section for switching the received communication signals; and a plurality of outgoing sections for transmitting a switched communication signal to succeeding nodes; wherein each incoming section comprises:

direct transfer means for transferring notification data to notify a destined outgoing section directly without going through the switching section; and each outgoing section comprises:

direct receiving means for receiving the notification data sent from the direct transfer means of each incoming section.

2. The transfer device in a transfer node within a telecommunication network according to claim 1, wherein each incoming section further comprises:

detection means for detecting a troubled situation of a communication path;

discrimination means for discriminating control information in an incoming communication signal;

notification means for notifying detected trouble information and discriminated control information to corresponding outgoing sections; and a switching information memory provided at the notifying means for storing destinations to be notified of the trouble and other control information according to switching modes which are at least one of cross-connection, add-drop and non-symmetrical; and each outgoing section further comprises:

discrimination means for discriminating trouble and other control information from the received data; and insertion means for inserting the discriminated notified information to a corresponding main signal.

3. The transfer device in a transfer node within a telecommunication network according to claim 2 or 1, wherein said direct transferring and receiving means between each incoming section and each outgoing section is constructed with a multi-master mode.

4. The transfer device in a transfer node within a telecommunication network according to claim 2 or 1, wherein said direct transferring and receiving means between each incoming section and each outgoing section is constructed with an Ethernet 10 Base-2.

5. A transfer device in a transfer node within a telecommunication network comprising:

a plurality of incoming sections at which communication signals are received from preceding nodes;

a switching section for switching the received communication signals; and a plurality of outgoing sections for transmitting a switched communication signal to succeeding nodes; wherein each incoming section comprises:

direct transfer path that transfers notification data to notify a destined outgoing section directly without going through the switching section; and each outgoing section comprises:

direct receiving path that receives the notification data sent from the direct transfer path of each incoming section.

6. The transfer device in a transfer node within a telecommunication network according to claim 5, wherein each incoming section further comprises:

a detector that detects a troubled situation of a communication path;

a discriminator that discriminates control information in an incoming communication signal;

a notification element that provides detected trouble information and discriminated control information to corresponding outgoing sections;

a switching information memory provided at the notification element that stores destinations to be notified of the trouble and other control information according to switching modes which are at least one of cross-connection, add-drop and non-symmetrical; and each outgoing section further comprises:

a discrimination element that discriminates trouble and other control information from the received data;

an insertion element that inserts the discriminated notified information to a corresponding main signal.

7. The transfer device in a transfer node within a telecommunication network according to claim 5 or 6, wherein said direct transferring and receiving paths between each incoming section and each outgoing section are constructed with a multi-master mode.

8. The transfer device in a transfer node within a telecommunication network according to claim 5 or 6, wherein said direct transferring and receiving paths between each incoming section and each outgoing section are constructed with an Ethernet 10 Base-2.

* * * * *

UNITED STATES PATENT AND TRADEMARK OFFICE
CERTIFICATE OF CORRECTION

PATENT NO. : 6,144,642
DATED : November 7, 2000
INVENTOR(S) : Naohiro Shimada

It is certified that error appears in the above-identified patent and that said Letters Patent is hereby corrected as shown below:

Column 7, line 13, delete "2 or 1" insert --1 or 4--

Column 7, line 18, delete "2 or 1" insert --1 or 4--

Signed and Sealed this

Twenty-second Day of May, 2001

Attest:

NICHOLAS P. GODICI

Attesting Officer

Acting Director of the United States Patent and Trademark Office

UNITED STATES PATENT AND TRADEMARK OFFICE
CERTIFICATE OF CORRECTION

PATENT NO. : 6,144,642
DATED : November 7, 2000
INVENTOR(S) : Naohiro Shimada

It is certified that error appears in the above-identified patent and that said Letters Patent is hereby corrected as shown below:

<u>Column 7,</u>
Line 13, delete "2 or 1" insert -- 1 or 4 --;
Line 18, delete "2 or 1" insert -- 1 or 4 --.

Signed and Sealed this

Eleventh Day of May, 2004

JON W. DUDAS
*Acting Director of the United States Patent and Trademark Office*